H. H. EBY.

COB-CARRIERS FOR CORN-SHELLERS.

No. 7,851. Reissued Aug. 21, 1877.

Attest:
R. T. Dyer
Geo. C. Tracy

Inventor:
Henry H. Eby
by Geo. W. Dyer & Co
Attys.

N. PETERS, PHOTO-LITHOGRAPHER, WASHINGTON, D. C.

UNITED STATES PATENT OFFICE.

HENRY H. EBY, OF MENDOTA, ILLINOIS.

IMPROVEMENT IN COB-CARRIERS FOR CORN-SHELLERS.

Specification forming part of Letters Patent No. 134,790, dated January 14, 1873; Reissue No. 7,851, dated August 21, 1877; application filed March 20, 1877.

*To all whom it may concern:*

Be it known that I, HENRY H. EBY, of Mendota, in the county of La Salle and State of Illinois, have invented an Improvement in Cob-Carriers for Corn-Shellers, of which the following is a specification:

The object of my invention is the production of a cob-carrier for power corn-shellers, to receive the cobs from the spout of the sheller and deliver them in any desired direction, which is adapted to be adjusted both vertically and horizontally upon its supporting-frame and driving mechanism without interfering with or stopping its operation; and my invention therein consists in mounting the carrying-frame upon a revolving block at its inner end and upon adjustable legs at the outer end, and driving the endless belt by cog-gearing applied at the inner end thereof; and further, in the combination, with such parts, of the central vertical shaft and its connections for transmitting power from a pulley to the inner end of the endless belt, all as fully hereinafter described, for effecting the purpose before explained.

To enable others skilled in the art to manufacture and use my invention, I proceed to describe the same, having reference to the drawings, in which—

Figure 1:
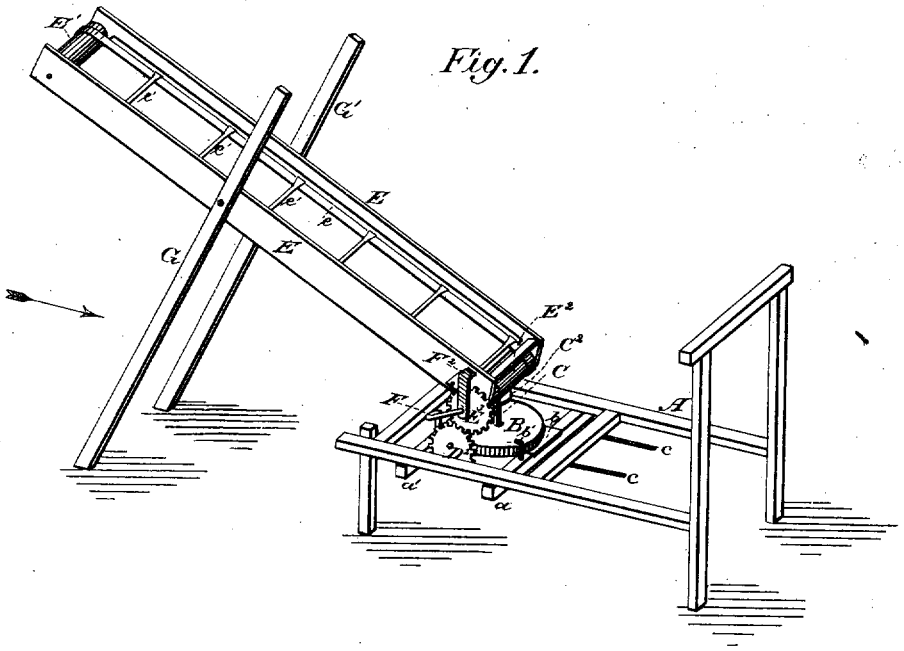
Figure 2:
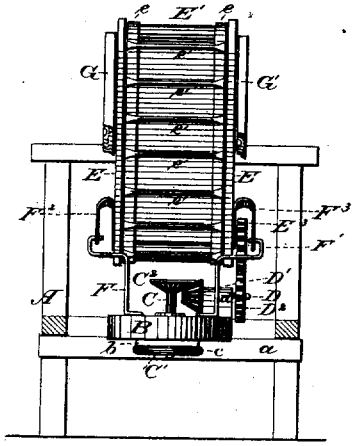
Figure 3:
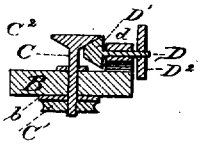
Figure 4:
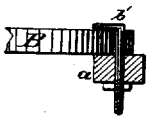

Figure 1 is a perspective view of the machine; Fig. 2, an end elevation looking in the direction of the arrow in Fig. 1, with a part of the supporting-frame removed, and the pivoted supports broken away to show the operating mechanism; Fig. 3, a sectional view of a part of the operating mechanism; and Fig. 4, a view of one of the hook-bolts for guiding and holding the revolving block.

Like letters denote corresponding parts in each figure.

A represents a proper frame-work for supporting the operating parts of the machine, upon the cross-pieces *a a'* of which is mounted a disk or block, B. This block may rest upon a plate or support, *b*, connecting the cross-pieces *a a'*, and is held in position and guided by any suitable number of hook-bolts, *b'*, secured in the frame and having their upper ends turned over the block, which allow it to be revolved easily in either direction. A vertical shaft, C, passes loosely through the plate *b* and the center of the block B, and is provided on its lower end, below such plate, with a suitable pulley, $C^1$, around which a belt, *c*, passes for driving the operating mechanism. This shaft C projects above the block B, and a bevel-gear wheel, $C^2$, is keyed on its upper end. D is a short horizontal shaft, which is supported on one side of the movable block B in a standard, *d*. The inner end of this shaft has a bevel-gear wheel, $D^1$, which meshes with the bevel-gear $C^2$ on the vertical shaft C, and the outer end is provided with a spur-wheel, $D^2$. E is the carrying spout or frame, of any proper form, having at its upper and lower ends the rollers $E^1$ $E^2$, around which the endless carrying-belts *e e* extend, provided with suitable cross-slats *e'*.

The inner or lower end of the carrying-frame is supported by arms F $F^1$, which rise from the block B, to which they are rigidly secured, and are pivoted to hangers $F^2$ $F^3$, attached to the sides of such carrying-frame. The shaft of the roller $E^2$ is extended through one side of the carrying-frame, and a cog-wheel, $E^3$, is keyed thereon, which meshes with the cog-wheel $D^2$ on the horizontal shaft D. The arms F $F^1$ are pivoted to the hangers $F^2$ $F^3$ on the line of the shaft of the roller $E^2$, so that the outer end of the carrying-frame can be raised or lowered to any desired extent without throwing the cog-wheels $D^2$ and $E^3$ out of gear, and without affecting in the least the operation of the endless belt.

To the sides of the carrying-frame, at any desired point, are pivoted the supporting-legs G G', which support the outer or upper end of such carrying-frame. By means of these pivoted supports the outer end of the carrying-frame is adapted to be raised or lowered and supported at any desired elevation.

In operation, the carrying-frame is located with reference to the corn-sheller in such manner that the cobs can be discharged upon the lower end of the endless belt. Motion being communicated to the pulley $C^1$, the endless belt is operated through the gearing described, and the cobs moved to and thrown from the outer or upper end of the carrying-frame. The cobs are delivered into a wagon driven under the end of the carrier, or into any proper stationary or removable receptacle.

When desired to turn the carrying-frame to either side, to deliver the cobs in any other direction or into other receptacles, the outer end is moved bodily around, which moves the block B and the gearing, and the hook-bolts *b'* may then be tightened up to hold the parts more rigidly in their new position.

By means of the devices for supporting the carrier and the gearing for driving the endless belt at the inner end of the carrying-frame, any extent of movement of such carrying-frame is permitted without stopping the operation of the endless belt, and this movement is effected with but little inconvenience and delay. The changing of the direction of the carrying-frame both vertically and horizontally could not be performed with as great facility if the endless belt were driven otherwise than at its inner end, where the least movement is made, or if the said carrying-frame were supported by less efficient means than those described.

Having thus described my invention and explained some of its advantages, what I claim as new, and desire to secure by Letters Patent, is—

1. A movable independent cob-carrier wherein are combined a supporting and revolving block, a carrying-frame whose inner end is supported upon said block, and whose outer end is supported upon movable legs, and gearing applied at the inner end of the carrying-frame and capable of acting continuously, whether the carrying-frame is fixed in position or being swung to a new position, substantially as described.

2. A movable independent cob-carrier wherein are combined a carrying-frame supported at its inner end upon a revolving block, and the central vertical shaft and its connections, whereby the said carrying-frame can be adjusted vertically and horizontally without stopping the operation of the endless belt, substantially as and for the purposes set forth.

This specification signed and witnessed this 27th day of January, A. D. 1877.

HENRY H. EBY.

Witnesses:
FREDRIC WORSLEY,
H. HARRINGTON.